United States Patent
Mader

(10) Patent No.: US 10,454,274 B2
(45) Date of Patent: Oct. 22, 2019

(54) STORAGE UNIT FOR A CONSUMER, STORAGE SYSTEM, AND METHOD OF CONTROLLING A STORAGE SYSTEM

(71) Applicant: Volllast GmbH, Schwabsoien (DE)

(72) Inventor: Tobias Mader, Schwabsoien (DE)

(73) Assignee: Volllast GmbH, Schwabsoien (DE)

( * ) Notice: Subject to any disclaimer, the term of this patent is extended or adjusted under 35 U.S.C. 154(b) by 0 days.

(21) Appl. No.: 15/580,990

(22) PCT Filed: Jun. 8, 2016

(86) PCT No.: PCT/EP2016/063048
§ 371 (c)(1),
(2) Date: Dec. 8, 2017

(87) PCT Pub. No.: WO2016/198458
PCT Pub. Date: Dec. 15, 2016

(65) Prior Publication Data
US 2018/0166879 A1    Jun. 14, 2018

(30) Foreign Application Priority Data

Jun. 9, 2015    (DE) ..................... 10 2015 109 113

(51) Int. Cl.
*H02J 7/00*    (2006.01)
*H02J 3/32*    (2006.01)
*H02J 13/00*    (2006.01)

(52) U.S. Cl.
CPC ............. *H02J 3/32* (2013.01); *H02J 7/0068* (2013.01); *H02J 13/0017* (2013.01); *Y02E 60/722* (2013.01); *Y02E 60/7807* (2013.01); *Y04S 10/14* (2013.01); *Y04S 40/12* (2013.01)

(58) Field of Classification Search
CPC ... Y02E 60/12; Y02E 60/722; Y02E 60/7807; H02J 3/32
(Continued)

(56) References Cited

U.S. PATENT DOCUMENTS

| | | | |
|---|---|---|---|
| 5,548,201 A * | 8/1996 | Grabon | H02J 7/0091 320/150 |
| 2011/0109158 A1* | 5/2011 | Olsen | B60L 3/0069 307/10.1 |

(Continued)

FOREIGN PATENT DOCUMENTS

| | | |
|---|---|---|
| DE | 102013207697 A1 | 10/2014 |
| EP | 2830145 A1 | 1/2015 |
| WO | 2014/019606 A1 | 2/2014 |

OTHER PUBLICATIONS

"Das Caterva Energiespeichersystem (ESS)," press release <http://www.caterva.de/pdf/Caterva_ESS_Paper.pdf> [retrieved Jan. 12, 2016], May 2014, 8 pages.

(Continued)

*Primary Examiner* — Yalkew Fantu
(74) *Attorney, Agent, or Firm* — Christensen O'Connor Johnson Kindness PLLC

(57) ABSTRACT

A storage unit for a consumer is described, having an energy storage in which electric energy can be stored, and a current interface via which the storage unit can be connected to an electricity grid. The storage unit furthermore has a circuit arrangement which is arranged between the energy storage and the current interface in the direction of current flow, and a control interface for controlling the storage unit. The storage unit is controllable only via the control interface which communicates only with an external control. A storage system and a method of controlling a storage system are furthermore described.

18 Claims, 3 Drawing Sheets

Figure 1:
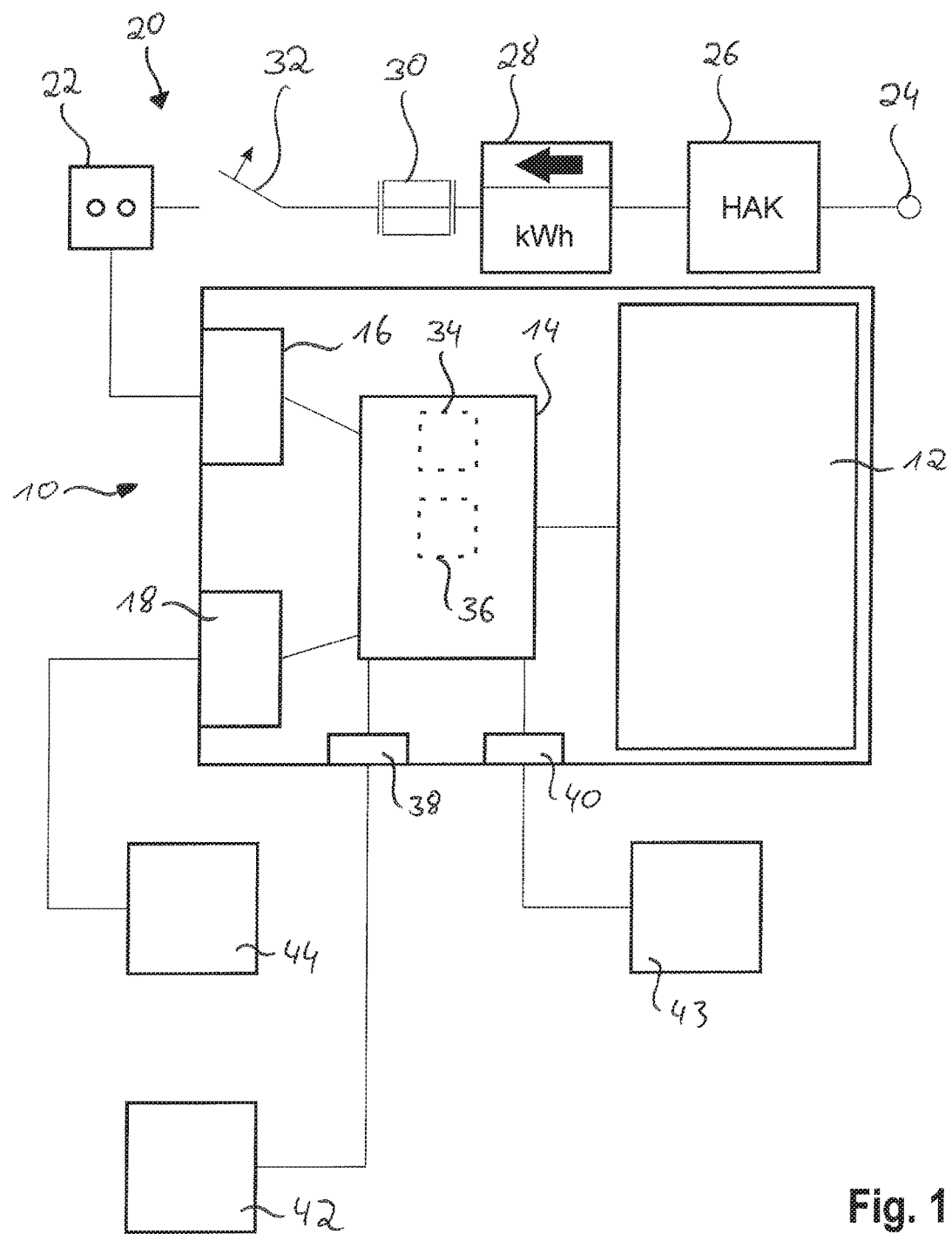

(58) Field of Classification Search
USPC .......................................................... 320/128
See application file for complete search history.

(56) References Cited

U.S. PATENT DOCUMENTS

| | | | | |
|---|---|---|---|---|
| 2012/0059527 A1* | 3/2012 | Beaston | .............. | H01M 10/441 700/295 |
| 2013/0320929 A1* | 12/2013 | Walker | .................. | H02J 7/0022 320/128 |
| 2014/0236369 A1* | 8/2014 | Kearns | ...................... | H02J 3/00 700/291 |
| 2015/0008864 A2* | 1/2015 | Wolter | ...................... | H02J 7/35 320/101 |

OTHER PUBLICATIONS

International Preliminary Report on Patentability and Written Opinion dated Dec. 12, 2017, issued in corresponding International Application No. PCT/EP2016/063048, filed Jun. 8, 2016, 8 pages.
Office Action dated Jan. 14, 2016, issued in corresponding German Application No. 102015109113.5, filed Jun. 9, 2015, 15 pages.
International Search Report dated Aug. 23, 2016, issued in corresponding International Application No. PCT/EP2016/063048, filed Jun. 8, 2016, 2 pages.
Written Opinion of the International Search Authority dated Aug. 23, 2016, issued in corresponding International Application No. PCT/EP2016/063048, filed Jun. 8, 2016, 6 pages.

* cited by examiner

STORAGE UNIT FOR A CONSUMER, STORAGE SYSTEM, AND METHOD OF CONTROLLING A STORAGE SYSTEM

The invention relates to a storage unit for a consumer, to a storage system having at least one storage unit, and to a method of controlling a storage system.

The ecological consciousness of people has increased in recent years, as a result of which more and more energy is provided by renewable energy sources to cover the increasing energy demand of people and to reduce the portion of fossil energy sources. The renewable energy sources are for example wind power or solar energy. Wind turbines or solar modules are used to generate energy in the event of wind or when the sun is shining.

As the energy demand is independent of the weather conditions, it is necessary to create possibilities by means of which energy generated from renewable energy sources can be stored and be retrieved as required.

Usually, pumped-storage power plants are used to create such capacities and to temporarily store energy. If more energy than required is generated via the renewable energy sources, the excess energy may be used to pump water to a higher potential energy level. As soon as the energy demand increases and is no longer covered by the currently generated energy, the pumped-up water can be drained to generate energy via turbines. Using the pumped-storage power plants, it is thus possible to balance fluctuations in the supply grid or to reduce excess capacities.

The drawback became apparent that pumped-storage power plants need a lot of room and that the construction and maintenance are expensive.

A further aspect relates to the complete coverage supply accompanying a stable supply grid. Due to geographic conditions, less energy can for example be generated from wind power in Southern Germany than in Northern Germany. This results in a differential as to the available capacities which are essential to a stable mains supply.

The prior art further discloses decentralized storage units which are used by consumers, for example if a solar module is provided on the roof of a building of the consumer. These storage units are used to supply the in-house electricity grid directly with generated solar energy. The storage units can further directly feed produced excess capacities into a supply grid. In such storage units, the private user can decide how much energy is to be fed into the supply grid or is to be directly used. Consequently, the energy fed into the supply grid varies without the grid operator or the energy supplier being able to influence this. Such storage units therefore do not constitute a reliable possibility to balance fluctuations in the supply grid. The grid operator or the energy supplier can at best retrieve data of the corresponding storage unit.

The object of the invention is to provide a cost-effective possibility by means of which fluctuations in the supply grid can be balanced in a cost-effective and efficient manner.

The object is achieved according to the invention by a storage unit for a consumer, having an energy storage in which electric energy can be stored, a current interface via which the storage unit can be connected to an electricity grid, a circuit arrangement which is arranged between the energy storage and the current interface in the direction of current flow, and a control interface for controlling the storage unit, the storage unit being controllable only via the control interface which communicates only with an external control means.

The object is furthermore achieved by a storage system according to the invention, having a control means and at least one storage unit of the type mentioned above, the control means controlling the storage unit.

The object is further achieved by a method according to the invention of controlling a storage system which comprises an external control means and at least one storage unit which includes a control interface and an energy storage, the at least one storage unit being piloted by the control means such that the storage unit temporarily stores electric energy from an electricity grid in the energy storage and/or feeds electric energy from the energy storage into the electricity grid.

The basic idea of the invention is to provide a decentralized storage unit which can be used by a consumer and functions as a temporary storage and can easily be connected to the electricity grid. The storage unit is therefore a so-called "plug and play" device which can be connected by the consumer himself/herself via a socket in his/her electricity grid, i.e. the electricity grid at the consumer's house which may also be referred to as domestic electricity grid. A technician as is required for the installation of storage units cooperating with a photovoltaic installation is here usually not necessary (apart from the cases in which no socket is present a the place of installation and an electrician has to mount and connect a socket there). The storage unit is part of a cluster storage formed by the storage system which can comprise the control means and a plurality of storage units via which a large virtual storage is formed.

As the storage unit communicates only with the external control means and can only be controlled via this control means, it is ensured that neither the consumer nor an unauthorized person has access to the control of the storage unit. The external control means may be provided at the place of an energy supplier or of a grid operator of a supply grid connected to the electricity grid. The energy supplier or the grid operator has access to the at least one decentralized storage unit via the control interface such that it can control the storage unit from the outside. It is thus possible that the energy supplier or the grid operator decides whether energy from the supply grid is to be temporarily stored into the storage unit or whether temporarily stored energy from the storage unit is to be consumed by the corresponding consumer, i.e. has to be fed into the consumer's electricity grid (domestic electricity grid), as a result of which the supply grid is relieved. The energy supplier or the grid operator thus operates the cluster storage.

Optionally, it may further be provided that the stored energy from the storage unit is fed into the supply grid.

However, the temporarily stored energy is preferably only used in the electricity grid of the consumer to minimize reference ballasts, in that the storage unit makes energy available to the electricity grid as required, as a result of which the supply grid is relieved. The supply grid than namely need not provide energy for the consumer having the storage unit.

The control of the access to the cluster storage can also be transferred from the energy supplier or the grid operator to an external service provider. This control service provider then controls the access to the cluster storage in accordance with the specifications of its customer, i.e. in accordance with the specifications of the energy supplier or the grid operator.

The energy supplier can simultaneously be the grid operator which operates and maintains the supply grid. This is however not obligatorily the case. Irrespective of who operates the grid, the control of the cluster storage can be taken on by a control service provider which pilots the cluster storage in accordance with the specifications of the "owner".

Alternatively, the grid operator and the energy supplier may simultaneously have access to the storage unit. It can be provided here that the grid operator and the energy supplier are able to pilot different areas. To exclude contradictory piloting operations, it may be provided that the grid operator assigns access rights to the energy supplier or vice versa. However, as a rule, merely one of the two has access to the storage unit.

According to a further alternative or additionally, the external control means may be provided at the place of a selected service provider which takes on the control for the energy supplier and/or the grid operator.

For a better readability, reference is made below to the energy supplier or the grid operator. However, it results from the aforementioned scenarios that other constellations are possible.

As far as excess capacities are present in the supply grid or in the electricity grid, the storage unit can be piloted by the external control means such that it temporarily stores electric energy. In case the available electric in the electricity grid is not sufficient to cover the energy demand, the control means can pilot the storage unit such that it feeds the temporarily stored electric energy into the electricity grid. The supply grid is thus (indirectly) relieved.

As merely the grid operator or the energy supplier has access to the storage unit, the storage unit can be used reliably to temporarily store energy which can be retrieved by the grid operator of the energy supplier as required. A reliable energy storage is correspondingly available to the grid operator or the energy supplier, only the grid operator or the energy supplier being adapted to be in charge thereof. The storage unit or the control is in particular not configured so as to automatically feed temporarily stored energy into the supply grid or to temporarily store energy from the supply grid.

The temporarily stored current in the storage unit is generally a so-called grey electricity which has previously been fed into the supply grid by the energy supplier. The electric energy stored in the at least one storage unit is merely temporarily stored from the supply grid via the electricity grid and is not directly available to the consumer. This means that the temporarily stored energy is not at the consumer's disposal itself. The current (grey electricity) temporarily stored in the storage unit is therefore not self-generated current (green power), either, which is for example generated by a photovoltaic installation and is temporarily stored by the consumer.

One aspect provides that the electricity grid is a single-phase low-voltage grid or a three-phase electricity grid. Consequently, the electric grid to which the storage unit is connected may be a domestic electricity grid which is coupled to a supply grid. The domestic electricity grid is usually connected to the supply grid via a house connection box. Due to the different connecting possibilities, the storage unit can be mounted in different places as a result of which the flexibility is correspondingly high.

The storage units can be accommodated in private households or in industrial buildings provided that they are not configured for the storage of electric energy. A storage unit can thus for example also be provided in a medium-sized company.

According to one aspect, the circuit arrangement comprises an inverter and a rectifier, the rectifier converting current received via the current interface into direct current for the energy storage and/or the inverter converting current to be fed into the electricity grid via the current interface into alternating current. It is ensured by the configuration of the circuit arrangement that the storage unit can store current from the electricity grid and can feed stored electric energy into the electricity grid as required.

The energy storage may have a storage capacity of between 1 kWh and 10 kWh, preferably of 2 kWh. Further, the energy storage may be a lead, lead-gel, lithium-ion, LiFEPO, Lipo, NiCd, NiFe or NiMH battery. Due to the low storage capacity of the energy storage, it is ensured that the storage unit is an apparatus which can be used at the consumer's place. It also results therefrom that using a storage unit, merely a fraction of the usually present daily demand of a private household can be covered.

Accordingly, the storage unit is a mobile unit by means of which the energy supplier can quickly respond to changing situations on the supply market. This applies, on the one hand, to the fluctuations of the supply grid and, on the other hand, to the price of electricity. If necessary, the storage unit can thus be charged with energy and be discharged several times in the course of the day.

A further aspect provides that the control interface is a wireless interface or a cable-connected interface which is also configured for data transmission. The control interface may in particular be a WLAN, Z-Wave, ZigBee, Enocean, Bluetooth, radio, LAN, Ethernet, Powerline, coaxial or glass fibre interface. The control means can pilot the storage unit from the outside via the corresponding control interface. Due to the realization of the control interface as a wireless interface, it is furthermore ensured that the storage unit can be installed at the consumer's place at a location at which otherwise no cable connection apart from the electric connection is present.

A further aspect provides that further devices can be connected to the storage unit. To this end, the storage unit in particular comprises further communication interfaces. The further devices can for example be multimedia devices and/or domestic appliances which can be connected to the storage unit via the control interface. However, the further devices cannot pilot the storage unit. This embodiment variant is particularly important in case the control interface is a wireless interface by means of which a plurality of devices can be connected simultaneously. The further optional communication interfaces can for example be USB, LAN, Ethernet, HDMI or NFC interfaces. Generally, the storage unit can be configured as a central communication unit at the consumer's place, in particular in a private household, via which all multimedia devices and/or domestic appliances communicate. The devices connected to the storage unit can, among others, transmit consumption values to the storage unit, which are directly read out by the energy supplier. To this end, the storage unit can, among others, form a bus system.

The storage unit preferably includes a modem and/or a router such that the storage unit can easily be incorporated into a network of the consumer or can be used by the user for installing his/her home network. The modem and/or the router appropriately includes at least the control interface and/or one of the communication interfaces.

The data received from the further devices can be transferred to the energy supplier, the grid operator and/or the service provider via the control interface which is also configured for data transmission. The data may be, among others, utilization data of further devices which are in the WLAN of the user having connected the storage unit.

The storage unit is in particular part of a master storage system. The storage system ensures that fluctuations in the supply grid can be balanced as one single storage unit has a relatively low storage capacity which would be insufficient to balance the usually occurring fluctuations in the supply grid or to generate sufficient energy in case the need arises. Using a plurality of storage units, it is possible to form the cluster storage, i.e. a large virtual storage which in reality is formed by the numerous small storage units. This leads to the possibility for the energy supplier or the grid operator to respond quickly and accurately as it can pilot individual small storage units.

The control means is in particular a central external control means via which a plurality of storage units can be controlled. As already explained, the control means can be provided at the place of an energy supplier or a grid operator of the supply grid able to pilot all storage units which belong to its catchment area. It is therefore possible that the grid operator monitors the supply grid and correspondingly balances fluctuations in the supply grid in that the energy demand of the individual consumers is covered by the storage units located at the consumers' places.

Alternatively, this can also be done by a service provider or the energy supplier having obtained a corresponding access to the supply area by the grid operator. Capacity peaks in the supply grid can thus be buffered in a simple manner via the plurality of storage units.

This ensures a stable supply grid as the energy supplier can rely on the fact that the storage units can generate the intended capacities when this is desired. The plurality of storage units arranged in a decentralized manner and each having only a relatively low storage capacity form a large virtual storage which can be inspected and controlled merely by the energy supplier, the grid operator or an instructed service provider. This in particular contributes to the stabilization of the supply grid as the plurality of small and decentralized storage units may be provided anywhere.

The energy demand of the individual households or consumers is thus covered by the storage units provided there, as a result of which the supply grid is relieved. A feeding back into the supply grid is not provided here. An indirect stabilization or relieve of the supply grid is therefore involved.

According to a specific embodiment, it may provided that the storage units feed current into the supply grid. It is therefore possible to realize a direct stabilization of the supply grid. Metaphorically speaking, the energy of a storage unit can be transmitted via the supply grid to a further consumer or household having a higher energy demand than the energy temporarily stored there or having no storage unit at all.

The storage unit can be configured such that exclusively the grid operator, the energy supplier and/or an instructed service provider has/have access to the storage unit and the energy temporarily stored from the supply grid via the control interface. The grid operator, the energy supplier and/or an instructed service provider can thus control the amount of energy stored in the storage unit in that the storage unit is piloted such that energy is temporarily stored in the storage unit or is delivered to the electricity grid to which the storage unit is connected.

The consumer himself/herself has no influence on the amount of temporarily stored energy or whether the temporarily stored energy is made available as is usually the case in decentralized storage units which are operated along with a photovoltaic installation or are coupled thereto. A remote access of the consumer via mobile radio, internet or an application on the smartphone does not permit the client to access to the storage unit or to the energy stored in the storage unit.

If energy from the storage units is fed into the electricity grid, this is performed on the client side of the meter. The feeding into the entire grid thus acts as load reduction.

The feeding-back into the public electricity grid (supply grid) to reduce grid loads merely constitutes an optional possibility.

As the access to the storage unit, in particular the control thereof is limited for the consumer, the storage unit preferably remains the property of the energy supplier or of the grid operator operating the supply grid, even if the storage unit is provided at the consumer's place. Alternatively, the storage unit can also be the property of a different energy supplier. A storage unit can for example be offered by an energy supplier A, though the energy supplier B delivers energy to the consumer and to this end uses the supply grid of the grid operator C. The storage unit can also be the property of the grid operator C, though the energy supplier B supplies the consumer with energy.

The storage unit can for example be offered to the consumer free of charge or in connection with a modern communication service such that a central bus system can be installed without additional costs. Due to the cluster storage, the energy supplier has the advantage that it is able to actively take part in the electricity market and to purchase energy in a cost-effective manner and temporarily store it, this energy being adapted to be sold at a high price later. In contrast thereto, the grid operator has interest in a cluster storage as it can, among others, hold instantaneous reserves due to the grid-integrated storage units, and gets possibilities for a voltage and frequency conservation, and because the supply rebuilding is simplified.

According to one aspect, the storage unit buffers fluctuations in a supply grid to which the electricity grid is connected. The storage unit can thus be considered as an energy buffer for the supply grid which is piloted by the energy supplier or the grid operator such that the storage unit contributes to the stable operation of the supply grid or such that the grid operator can operate the supply grid in a stable manner. As only the energy supplier or the grid operator has access to the storage unit, a reliable control is thus ensured via which the supply grid can be operated in a durable and reliable manner. In case the consumers themselves have access to the storage units, this would not be the case as electric energy which could be fed into the electricity grid to indirectly relieve the supply grid is possibly no longer available.

The storage unit connected to the electricity grid in particular relieves the supply grid in that energy is delivered to the electricity grid which is consumed by the consumer of the electricity grid. An indirect relieve of the supply grid is thus involved as the energy is not fed back into the supply grid. The energy temporarily stored by the consumer is used there, as a result of which the supply grid is relieved as it is not necessary to supply energy from the supply grid to the electricity grid connected to the supply grid. The corresponding electricity grid is supplied by the storage unit at least for a short time.

Preferably, the storage unit is operated exclusively by the grid operator, the energy supplier and/or by an instructed service provider such that only the grid proprietor, the energy supplier and/or an instructed service provider has/ have access to the storage unit and the energy from the supply grid temporarily stored in the storage unit via the control interface. The consumer having the storage unit therefore has no possibility to operate the storage unit himself/herself. The storage unit is exclusively operated externally or piloted from the outside.

The feeding of the storage unit is exclusively performed via the supply grid and the interposed domestic electricity grid to which the storage unit is connected. As a result, the storage unit is not supplied with energy by a photovoltaic installation. A connection for a photovoltaic installation is not provided in the storage unit, which is why it can be referred to as connectionless for a photovoltaic installation.

It is in particular provided that the storage system comprises a plurality of storage units which are simultaneously piloted by the control means. It is therefore possible to form a large virtual storage which is also referred to as cluster storage as it comprises a plurality of real storage units. The individual storage units can be piloted to balance fluctuations in the supply grid and thus ensure the stability of the supply grid.

Figure 2:
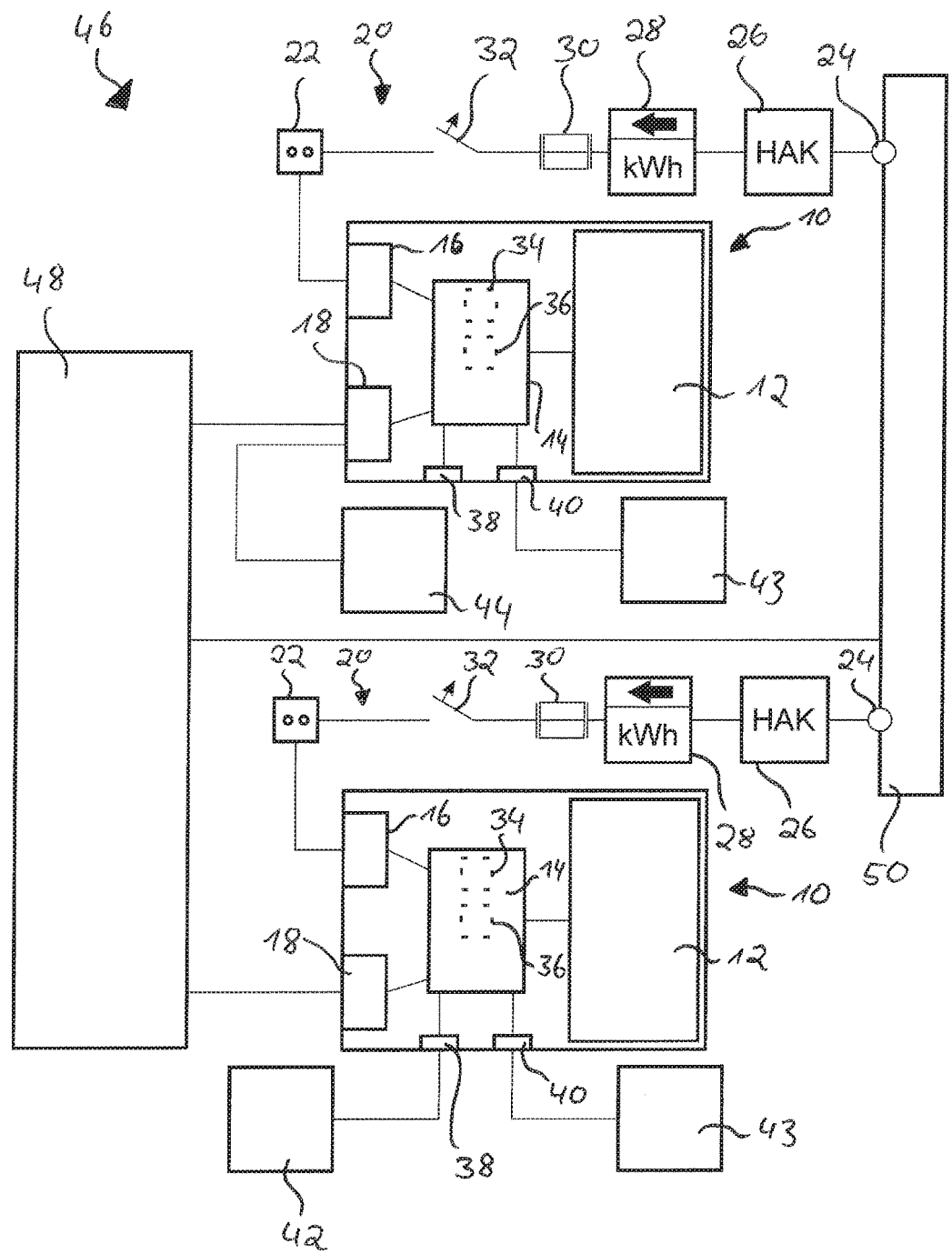

Further advantages and characteristics of the invention will become apparent from the description below and the drawings to which reference is made. The drawings show:

FIG. 1 a schematic diagram of a storage unit according to the invention,

FIG. 2 a schematic diagram of a storage system according to the invention, and

Figure 3:
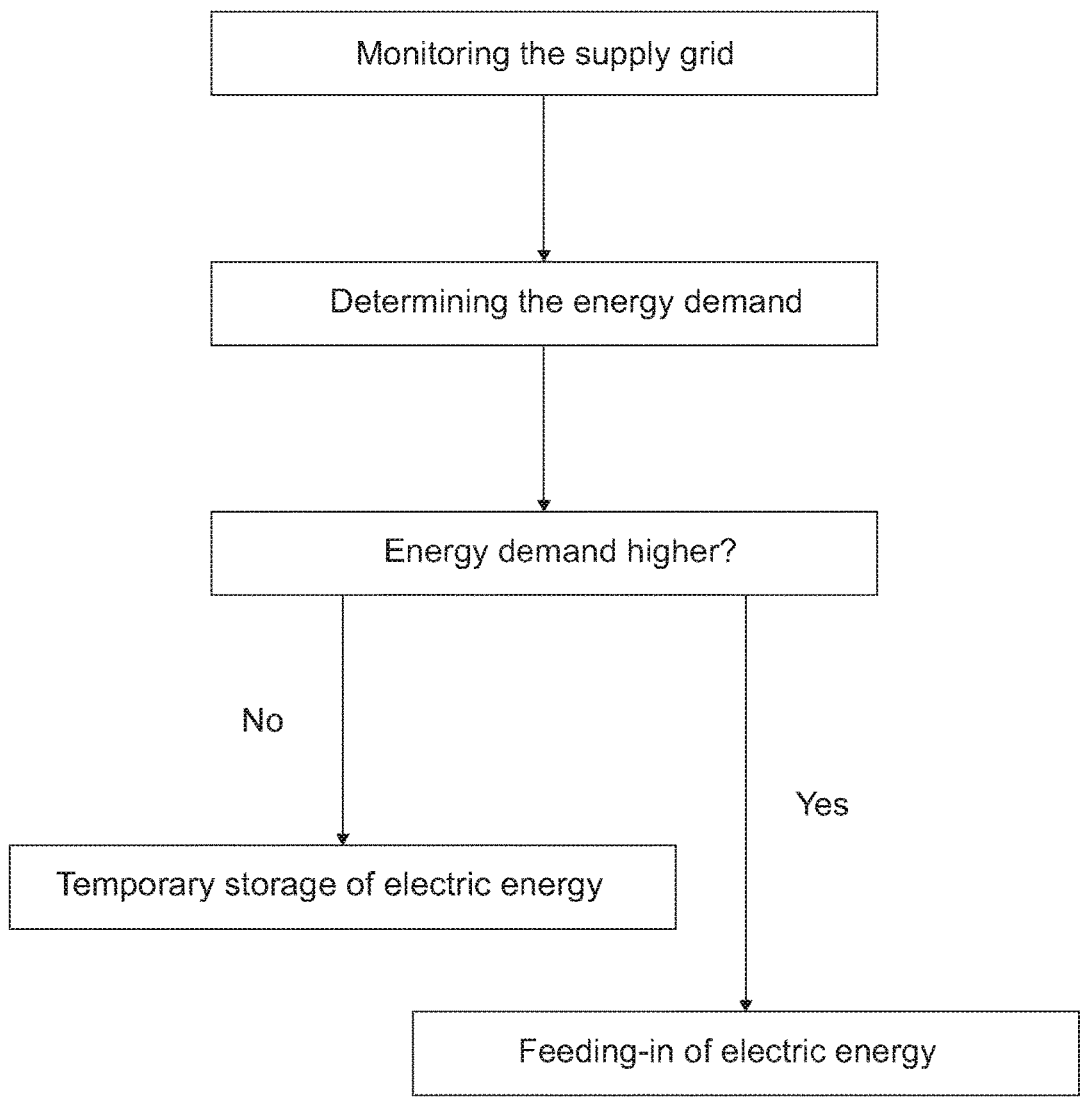

FIG. 3 a flow chart for illustrating the method according to the invention.

FIG. 1 shows a storage unit 10 for a consumer which includes an energy storage 12, a circuit arrangement 14, a current interface 16 and a control interface 18 which are in general also configured for data transmission. In the example embodiment shown, the consumer is a household.

The storage unit 10 is connected to a domestic electricity grid 20 via the current interface 16 in that in the embodiment shown, the current interface 16 is electrically connected to a household socket 22. The storage unit 10 is therefore a so-called "plug and play" device which is simply plugged into the household socket 22 to be put into operation.

The domestic electricity grid 20 is connected to a supply grid not shown here via a connection 24. The connection 24 may be provided on a house connection box 26. Generally, the domestic electricity grid 20 has, among others, an electricity meter 28, a NZ resistance 30 and a residual current circuit breaker 32 between the connection 24 and the household socket 22.

The storage unit 10 can temporarily store energy from the supply grid via the domestic electricity grid 20, the circuit arrangement 14 comprising to this end a rectifier 34 which converts alternating current provided in the domestic electricity grid 20 into a direct current such that the electric energy can be fed to the energy storage 12 and can be stored there.

The energy storage 12 is a small to medium-sized energy storage having a storage capacity of between 1 kWh and 10 kWh, preferably of 2 kWh. This merely corresponds to a fraction of the typical daily needs of a private household. The energy storage 12 may be configured as a lead, lead-gel, lithium-ion, LiFEPO, Lipo, NiCd, NiFe or NiMH battery.

As the storage unit 10 is merely provided for the temporary storage of the electric energy from the domestic electricity grid 20 or of the supply grid supplying the domestic electricity grid 20, the storage unit 10 is adapted to feed temporarily stored electric energy from the energy storage 12 into the domestic electricity grid 20. To this end, the circuit arrangement 14 has an inverter 36 which converts the direct current coming from the energy storage 12 into alternating current such that the electric energy can be fed into the domestic electricity grid 20.

The rectifier 34 and the inverter 36 are represented in a dashed line as they are integral parts of the circuit arrangement 14.

The control of the storage unit 10 is performed only via the control interface 18 which communicates with an external control means as will be explained below. The storage unit 10 obtains via the control interface 18 the control signals at which time the storage unit 10 has to feed energy from the energy storage 12 into the domestic electricity grid 20 or has to temporarily store energy from the domestic electricity grid 20 in the energy storage 12.

The storage unit 10 in the embodiment shown further has two communication interfaces 38, 40 via which the further devices 42, 43 are connected to the storage unit 10 which can be multimedia and/or domestic appliances. The further communication interfaces 38, 40 may be cable-connected or wireless communication interfaces such as a USB, WLAN or LAN interface. Alternatively, Z-Wave, ZigBee, Enocean, Bluetooth, radio, Ethernet, Powerline, coaxial or glass fiber interfaces may be involved.

A further device 44 which can also be a multimedia and/or domestic appliance is coupled to the control interface 18 which is configured for data transmission as described at the beginning.

Accordingly, the further devices 42 to 44 may be a multimedia device such as a TV device, a computer, a notebook, a tablet or a mobile phone. Furthermore, domestic appliances adapted for communication can be connected to the storage unit 10 via the corresponding interfaces 18, 38, 40. Domestic appliances adapted for communication may be washing machines, driers, coffee machines, refrigerators, dish washing machines, ovens, etc. The further devices 42 to 44 can transmit information to the storage unit 10 centralized in the household, energy consumption data being for example involved. These data can be transmitted via the control interface 18.

The owner of the private household can control the further devices 42 to 44 via the control unit 10. The owner of the private household however has no access to the energy storage 12 and the stored energy.

The storage unit 10 in particular comprises a modem and/or a router having at least the control interface 18 and/or one of the communication interfaces 38, 40. The user can also install his/her home network (WLAN) using this router.

FIG. 2 shows a storage system 46 having two storage units 10 in the embodiment shown, which are each connected to a common central control means 48 via their control interface 18.

The storage units 10 are each incorporated in an individual domestic electricity grid 20, the two domestic electricity grids 20 being connected to a common supply grid 50 via their respective connection 24. Both domestic electricity grids 20 are therefore supplied by the supply grid 50 which is operated by a grid operator at the place of which the control means 48 may be provided. Alternatively, the control means 48 may be provided at an energy supplier's place which supplies the domestic electricity grid 20 with energy via the supply grid 50. The grid operator here acts as a service provider for the energy supplier.

It can furthermore be provided that the control means 48 is located at a place of the control service provider taking on the control of the storage system 46, in particular for the energy supplier or the grid operator.

Metaphorically speaking, FIG. 2 shows two separate private households, for example two single family houses in a housing estate which have their own domestic electricity grid 20 respectively connected to the common supply grid 50 of the grid operator operating the central control means 48. Both private households can furthermore be supplied with energy by a common energy supplier.

The central control means 48 is also coupled to the supply grid 50 to monitor the supply grid 50. The control means 48 thus determines whether capacity peaks which need to be buffered are present in the supply grid 50. The central control means 48 further determines whether the energy demand exceeds the energy available in the supply grid 50 or in the corresponding domestic electricity grid 20. Generally, it is thus possible to balance fluctuations in the supply grid 50.

The central control means 48 can determine the energy demand as it is preferably connected to the storage units 10 such that the central control means 48 can directly determine the energy demand of any private household and thus of all domestic electricity grids 20 connected to the supply grid 50. Otherwise, this can be determined via the supply grid 50 itself. This is for example performed via the control interface 18 which is configured for data transmission. It is then also possible to make further data available to the energy supplier or to the grid operator, in particular utilization data of the connected devices 42 to 44.

The central control means 48 then determines whether the overall energy demand is higher than the available electric energy. If so, the central control means 48 pilots the individual control units 10 such that electric energy temporarily stored in the individual storage units 10 is fed into the domestic electricity grid 20 associated with the storage unit 10 to cover the energy demand. The supply grid 50 is thus directly relieved as the consumer's domestic electricity grid 20 is supplied with the required energy by the feeding-in of the temporarily stored energy from the storage unit 10. The temporarily stored energy is energy previously obtained from the supply grid 50, i.e. so-called grey electricity.

In case the central control means 48 determines that the energy demand is lower than the electric energy available in the supply grid 50, it is adapted to pilot the storage units 10 such that excess electric energy from the supply grid 50 is temporarily stored in the respective energy storages 12 of the storage units 10 via the domestic electricity grids 20.

A feeding into the domestic electricity grid 20 is also possible if the energy supplier can purchase inexpensive energy and temporarily stores it in the storage unit 10, in particular in the energy storage 12, for a later consumption.

The storage of electric energy in the storage units 10 and the discharge of the storage units 10 can thus be performed irrespective of the grid situation.

The control of the respective storage units 10 is thus performed merely via the central control means 48. The owners of the private households cannot pilot the storage units 10 so as to have access to the energy storages 12. It is merely possible to pilot the further devices 42 to 44 which are connected to the communication interfaces 38, 40 and to the control interface 18.

It is in particular provided that no feeding-back into the supply grid 50 is possible. The energy temporarily stored in the storage unit(s) 10 is therefore made available exclusively to the domestic electricity grid 20, as a result of which reference ballasts of the supply grid 50 may be balanced indirectly.

Generally, the energy temporarily stored in the storage unit(s) 10 is energy provided by the energy supplier and transferred to the consumer by the grid operator, i.e. a so-called grey electricity. The energy temporarily stored in the storage unit(s) 10 is thus not self-generated energy (green electricity) as is the case in a connected photovoltaic installation.

The consumers which desire to use a storage unit 10 need not obligatorily have an expensive photovoltaic installation. Consequently, the market for potential users of the storage unit 10 is considerably larger, and an appropriate storage system 46 may be installed more rapidly.

The installation is furthermore considerably easier as the consumer simply plugs the storage unit 10 into a socket in his/her domestic electricity grid 20. A technician for the installation of the storage unit 10 is usually not necessary.

Using the storage system 46, it is therefore possible to form a cluster storage provided that many decentralized storage units 10 are provided in as many private households of the supply grid 50 as possible.

The invention claimed is:

1. A storage unit for a consumer, comprising:
   an energy storage configured to store electric energy;
   a current interface via which the storage unit can be connected to an electricity grid;
   a circuit arrangement arranged between the energy storage and the current interface in the direction of current flow; and
   a control interface configured to control the storage unit, the storage unit being controllable only via the control interface which communicates only with an external control such that neither the consumer nor an unauthorized person has access for control of the storage unit, wherein the storage unit is exclusively operated externally of the storage unit, and wherein the storage unit is configured to obtain via the control interface control signals at which time the storage unit supplies energy from the energy storage into the electricity grid or temporarily stores energy from the electricity grid in the energy storage.

2. The storage unit according to claim 1, wherein the electricity grid is a single-phase low-voltage grid or a three-phase electricity grid.

3. The storage unit according to claim 1, wherein the circuit arrangement comprises a rectifier and an inverter, the rectifier configured to convert current received via the current interface into direct current for the energy storage or the inverter configured to convert current to be fed into the electricity grid via the current interface into alternating current.

4. The storage unit according to claim 1, wherein the energy storage has a storage capacity of between 1 kWh and 10 kWh.

5. The storage unit according to claim 1, wherein the control interface is a wireless interface or a cable-connected interface which is also configured for data transmission.

6. The storage unit according to claim 1, wherein one or more devices are connected to the storage unit.

7. The storage unit according to claim 1, wherein the storage unit is part of a master storage system.

8. The storage unit according to claim 1, wherein the storage unit is configured such that the grid operator, the energy supplier or an instructed service provider has exclusive access to the storage unit and the energy temporarily stored from the supply grid via the control interface.

9. The storage unit according to claim 1, wherein the storage unit is configured such that the grid operator, the energy supplier and an instructed service provider have exclusive access to the storage unit and the energy temporarily stored from the supply grid via the control interface.

10. The storage unit according to claim 1, wherein the circuit arrangement comprises a rectifier and an inverter, the rectifier configured to convert current received via the current interface into direct current for the energy storage and the inverter configured to convert current to be fed into the electricity grid via the current interface into alternating current.

11. A storage system having a control and at least one storage unit, the control configured to control the storage unit, wherein the storage unit includes
an energy storage configured to store electric energy;
a current interface via which the storage unit can be connected to an electricity grid;
a circuit arrangement arranged between the energy storage and the current interface in the direction of current flow; and
a control interface configured provide control signals to the storage unit,
the storage unit being controllable only via the control interface which communicates only with an external control such that neither the consumer nor an unauthorized person has access to the control of the storage unit, wherein the storage unit is exclusively operated remotely of the storage unit, and wherein the storage unit is configured to obtain via the control interface control signals that cause the storage unit to supply energy from the energy storage into the electricity grid or to temporarily store energy from the electricity grid in the energy storage.

12. The storage system according to claim 11, wherein the control is a decentralized external control via which the plurality of storage units can be controlled.

13. A method of controlling a storage system having an external control and at least one storage unit comprising a control interface and an energy storage, comprising:
piloting the at least one storage unit by the external control such that the storage unit temporarily stores electric energy from an electricity grid in the energy storage or feeds electric energy from the energy storage into the electricity grid, wherein the storage unit is exclusively piloted remotely from the at least one storage unit, and wherein the storage unit obtains control signals via the control interface control signals which cause the storage unit to supply energy from the energy storage into the electricity grid or to temporarily store energy from the electricity grid in the energy storage.

14. The method according to claim 13, wherein the storage unit buffers fluctuations in a supply grid to which the electricity grid is connected.

15. The method according to claim 14, wherein the storage unit connected to the electricity grid relieves the supply grid in that energy is delivered to the electricity grid, which is consumed by the consumer of the electricity grid.

16. The method according to claim 13, wherein the storage system comprises a plurality of storage units which are simultaneously piloted by the external control.

17. The method according to claim 13, wherein the storage unit is operated exclusively by the grid operator, the energy supplier or an instructed service provider such that exclusively the grid operator, the energy supplier or an instructed service provider has/have exclusive access to the storage unit and the energy temporarily stored from the supply grid in the storage unit via the control interface.

18. The method according to claim 13, wherein the storage unit is operated exclusively by the grid operator, the energy supplier and an instructed service provider such that the grid operator, the energy supplier and an instructed service provider have exclusive access to the storage unit and the energy temporarily stored from the supply grid in the storage unit via the control interface.

* * * * *